US010964313B2

(12) United States Patent
Morishita et al.

(10) Patent No.: US 10,964,313 B2
(45) Date of Patent: Mar. 30, 2021

(54) WORD SCORE CALCULATION DEVICE, WORD SCORE CALCULATION METHOD, AND COMPUTER PROGRAM PRODUCT

(71) Applicant: KABUSHIKI KAISHA TOSHIBA, Tokyo (JP)

(72) Inventors: Terufumi Morishita, Kanagawa (JP); Takashi Masuko, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/388,494

(22) Filed: Dec. 22, 2016

(65) Prior Publication Data

US 2017/0270917 A1    Sep. 21, 2017

(30) Foreign Application Priority Data

Mar. 17, 2016   (JP) .............................. JP2016-053438

(51) Int. Cl.
*G10L 15/19* (2013.01)
*G10L 15/197* (2013.01)
*G06F 40/242* (2020.01)
*G06F 40/284* (2020.01)
*G10L 15/16* (2006.01)

(52) U.S. Cl.
CPC ............ *G10L 15/19* (2013.01); *G06F 40/242* (2020.01); *G06F 40/284* (2020.01); *G10L 15/16* (2013.01); *G10L 15/197* (2013.01)

(58) Field of Classification Search
USPC ................. 704/231, 232, 246, 247, 251, 252
See application file for complete search history.

(56) References Cited

U.S. PATENT DOCUMENTS

| 5,812,698 | A | * | 9/1998 | Platt | ................... G06K 9/00879 |
|           |   |   |        |       | 382/186 |
| 7,136,802 | B2 |  | 11/2006 | Ying et al. | |
| 2001/0053974 | A1 |  | 12/2001 | Lucke et al. | |
| 2002/0120448 | A1 | * | 8/2002 | Garner | .................... G10L 15/12 |
|           |   |   |        |       | 704/254 |

(Continued)

FOREIGN PATENT DOCUMENTS

| JP | 3059504 | 7/2000 |
| JP | 2004-117647 A | 4/2004 |

(Continued)

OTHER PUBLICATIONS

Bengio et al.; "A Neural Probabilistic Language Model", Journal of Machine Learning Research, vol. 3, pp. 1137-1155, (2003).
Mikolov et al.; "Recurrent Neural Network Based Language Model", Interspeech, pp. 1045-1048, (2010).

(Continued)

*Primary Examiner* — Leonard Saint Cyr
(74) *Attorney, Agent, or Firm* — Finnegan, Henderson, Farabow, Garrett & Dunner L.L.P.

(57) ABSTRACT

A word score calculation device according to an embodiment includes an input unit and a calculating unit. The input unit receives input of a string of words including known words, which are known already, and new words, which are not yet known. The calculating unit inputs the lexicon feature of a word, which is included in the string of words, in a neural network in which one or more unit groups for inputting the lexicon features of words are included in an input layer, and calculates a word score of the target word included in the string of words.

10 Claims, 11 Drawing Sheets

(56) References Cited

U.S. PATENT DOCUMENTS

| | | | | |
|---|---|---|---|---|
| 2004/0039570 | A1* | 2/2004 | Harengel | G10L 13/08 704/232 |
| 2004/0148381 | A1* | 7/2004 | Beppu | G06F 17/2735 709/223 |
| 2004/0167779 | A1 | 8/2004 | Lucke et al. | |
| 2004/0205671 | A1* | 10/2004 | Sukehiro | G06F 17/2735 715/259 |
| 2009/0024392 | A1* | 1/2009 | Koshinaka | G10L 15/06 704/257 |
| 2016/0163310 | A1* | 6/2016 | Lee | G10L 15/16 704/232 |
| 2016/0180838 | A1* | 6/2016 | Parada San Martin | G06F 1/3203 704/232 |
| 2016/0299685 | A1* | 10/2016 | Zhai | G06F 3/0219 |

FOREIGN PATENT DOCUMENTS

| | | |
|---|---|---|
| JP | 3907880 | 4/2007 |
| JP | 4245530 | 3/2009 |
| JP | 4543294 | 9/2010 |
| JP | 2015-75706 | 4/2015 |

OTHER PUBLICATIONS

Nakamura et al., "English Word Category Prediction Based on Neural Network," D-II (1991), J74:1-7.

\* cited by examiner

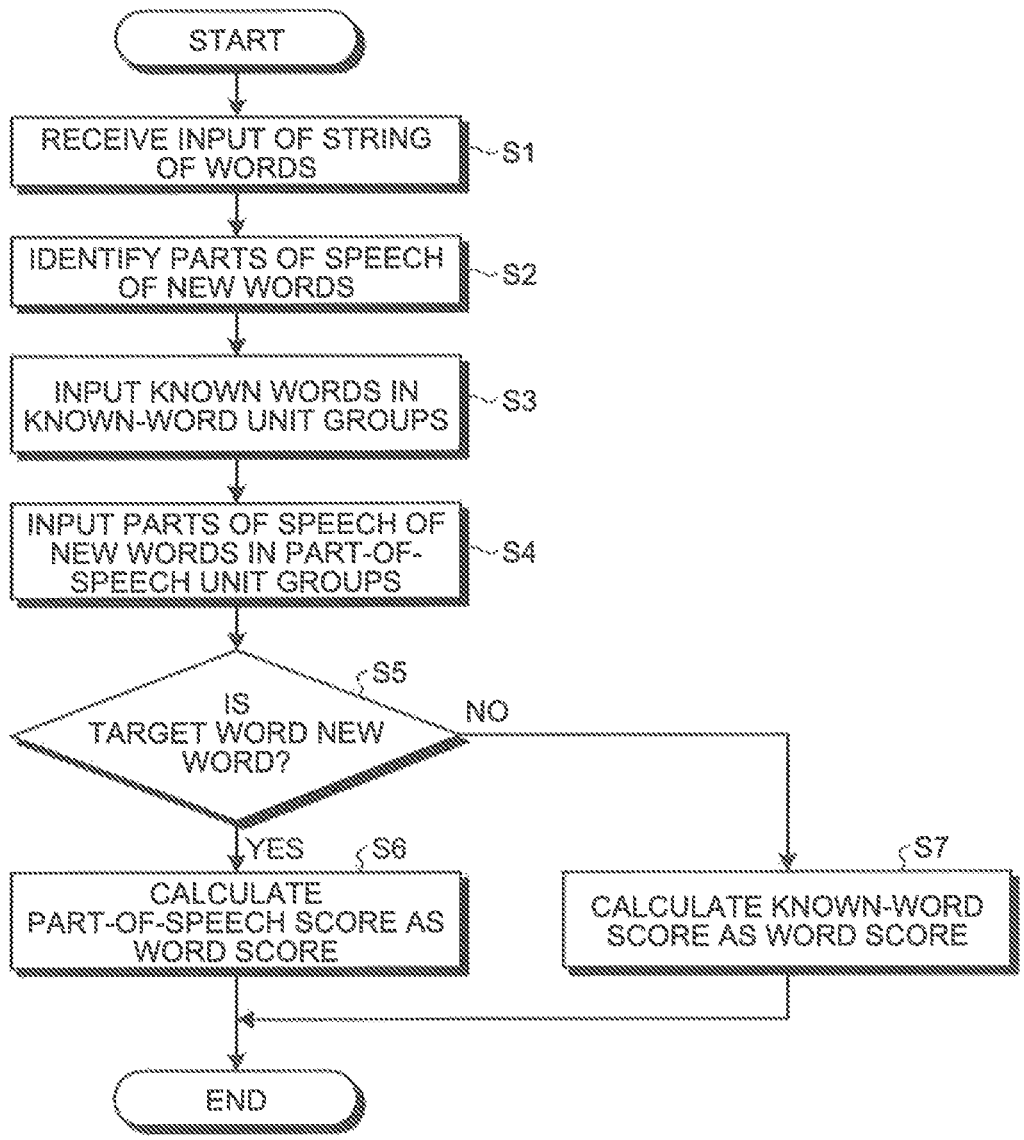

WORD SCORE CALCULATION DEVICE, WORD SCORE CALCULATION METHOD, AND COMPUTER PROGRAM PRODUCT

CROSS-REFERENCE TO RELATED APPLICATIONS

This application is based upon and claims the benefit of priority from Japanese Patent Application No. 2016-053438, filed on Mar. 17, 2016; the entire contents of which are incorporated herein by reference.

FIELD

Embodiments described herein relate generally to a word score calculation device, a word score calculation method, and a computer program product.

BACKGROUND

A conventional technology is known in which, when a string of words is provided, the word score of the word at a particular position in that string of words is calculated. In recent years, a technology for calculating the word score using a neural network has been developed.

The word score calculation technology is implemented in a recognition, system meant for voice recognition. For example, in a voice recognition system, when a user speaks, the voice recognition result may indicate a plurality of candidate strings of words. In the voice recognition system, for example, with respect to each candidate string of words, the word score of each word in the string of words can be calculated using the word score calculation technology, and the word scores can be added, so as to calculate the language score of the candidate string of words. Then, in the voice recognition, system, for example, from the language scores and the acoustic scores of the candidate strings of words, the relative merits and demerits of the candidate strings of words can be compared, and accordingly the voice recognition result can be decided.

A conventional word score calculation device holds a list of words called a lexicon. Thus, if such a string of words is provided which includes new words not included in the lexicon, then the word scores cannot be calculated.

BRIEF DESCRIPTION OF THE DRAWINGS

FIG. 4 is a flowchart for explaining an exemplary word score calculation method according to the first embodiment;

FIG. 5 is a diagram illustrating an example of new-word appearance scores according to a modification example of the first embodiment;

DETAILED DESCRIPTION

According to one embodiment, a word score calculation device includes an input unit and a calculating unit. The input unit receives input of a string of words including known words, which are known already, and new words, which are not yet known. The calculating unit inputs the lexicon feature of a word, which is included in the string of words, in a neural network in which one or more unit groups for inputting the lexicon features of words are included in an input layer, and calculates a word score of the target word included in the string of words.

Exemplary embodiments of a word score calculation device, a word score calculation method, and a computer program product are described below in detail with reference to the accompanying drawings.

First Embodiment

Firstly, the explanation is given about an exemplary functional configuration of a word score calculation device according to a first embodiment.

Functional Configuration of Word Score Calculation Device

Figures 1, 2:
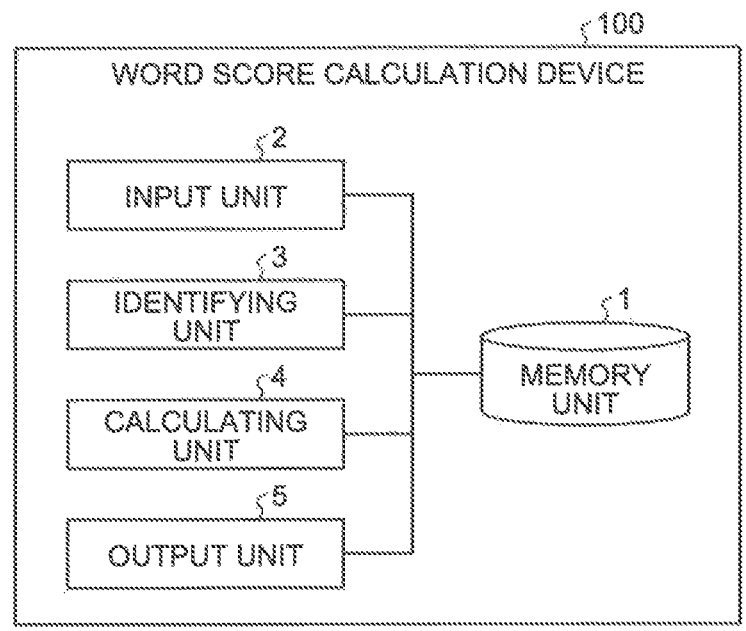
FIG. 1 is a diagram illustrating an exemplary functional configuration of a word score calculation device according to a first embodiment.
FIG. 2 is a diagram for explaining an example of word score calculation.

FIG. 1 is a diagram illustrating an exemplary functional configuration of a word score calculation device 100 according to the first embodiment. The word score calculation device 100 according to the first embodiment includes a memory unit 1, an input unit 2, an identifying unit 3, calculating unit and an output unit 5.

The memory unit 1 is used to store information. For example, the memory unit 1 is used to store a word list, a known-word dictionary, a new-word dictionary, and a neural network (see FIG. 3) described later.

The word list represents a list of words. In the following explanation, the word list is called a lexicon. Moreover, the words included in the lexicon are called known words, and the words not included in the lexicon are called new words.

The known-word dictionary is used to store known words, which are known already, in a corresponding manner to the lexicon feature of the known-words. The known words are commonly well-known words that are already registered in, for example, a Japanese dictionary. The lexicon feature represents the type of the set when a word is classified into a number of sets according a particular criterion. Examples of the lexicon feature include the part of speech. Alternatively, for example, the lexicon feature represents the name of the set classified according to the degree of similarity of words. Meanwhile, the words are not limited to be words in a natural language, and can also be symbols.

The new-word dictionary is used to store new words in a corresponding manner to the lexicon feature of the new words. Using the new-word dictionary, the word score calculation device 100 can treat unknown words as the new words. In the new-word dictionary, for example, new unknown words are added as new words by the user as needed.

In the following explanation of the first embodiment, the explanation is given about a case in which the part of speech of a word represents the lexicon feature thereof.

The input unit 2 receives input of a string of words including known words and new words.

The identifying unit 3 identifies the lexicon feature (in the first embodiment, the part of speech) of the new words included in a string of words. More particularly, firstly, the identifying unit 3 performs morphological analysis of the string of words and divides it into a plurality of words. Then, if a word is registered in the new-word dictionary, the identifying unit 3 refers to the new-word dictionary and identifies the part of speech of that word.

Operation for Calculation of Word Score

The calculating unit 4 calculates the word score of a target word included in a string of words. The target word represents the word for which the word score is to be calculated. Firstly, the explanation is given about a simple example of the word score. The word score of the target word is calculated using the conditional probability of the words excluding the target word under the condition given in the string of words.

FIG. 2 is a diagram for explaining an example of word score calculation. In the example illustrated in FIG. 2, a target word w3 included in strings of words 101 to 103 is calculated. In the string or words 101, the target word w3 is "ame (rain)". In the string of words 102, the target word w3 is "kabutomushi (beetle)". In the string of words 103, the target word w3 is "taberu (eat)".

The words other than the target words include a word w1 "ashita (tomorrow)" and a word w2 "wa". The calculating unit 4 calculates a word score P1 of the string of words 101, a word score P2 of the string of words 102, and a word score P3 of the string of words 103 according to Equations (1) to (3) given below respectively.

$$P1(w3=\text{ame}|w1=\text{ashita}, w2=\text{wa})=0.3 \quad (1)$$

$$P2(w3=\text{kabutomushi}|w1=\text{ashita}, w2=\text{wa})=0.1 \quad (2)$$

$$P3(w3=\text{taberu}|w1=\text{ashita}, w2=\text{wa})=0.2 \quad (3)$$

In the examples given in Equations (1) to (3), the string of words 101 has the highest word score. Hence, for example, when the strings of words 101 to 103 are obtained as the recognition result of the voice recognition system, it is understood that the string of words 101 has the highest likelihood of being the recognition result from the linguistic point of view.

More particularly, the calculating unit 4 calculates the abovementioned word scores using a neural network 200. Then, the output unit 5 outputs the word scores calculated by the calculating unit 4.

Figure 3:
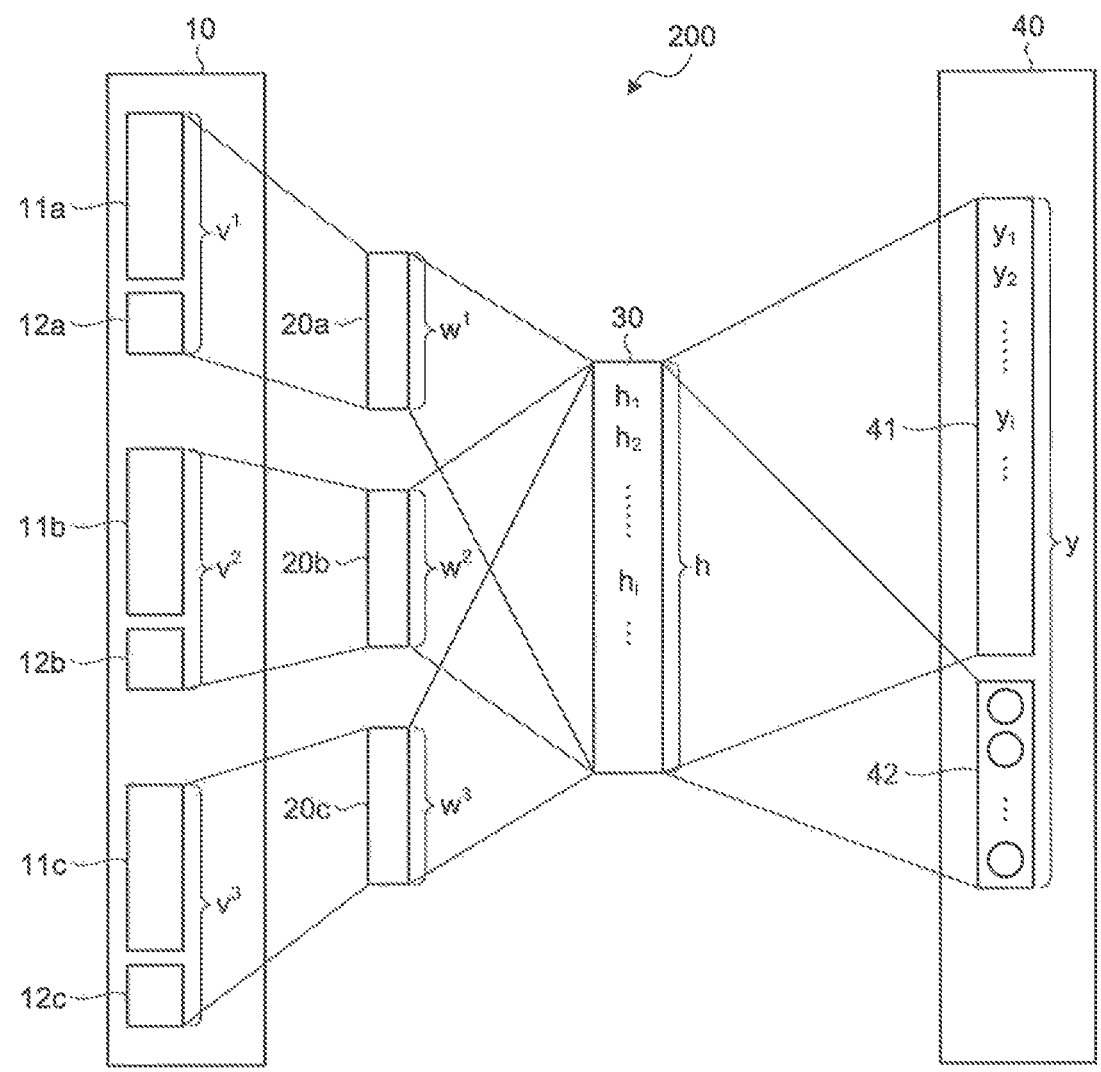
FIG. 3 is a diagram illustrating an exemplary neural network according to the first embodiment.

FIG. 3 is a diagram illustrating the neural network 200 according to the first embodiment. In FIG. 3 is illustrated an example of a feedforward neural network that calculates the word score of a target word, based on the three previous words of that target word. Herein, the number of words used in calculating the word score of a target word can be any arbitrary number. For example, the word score of a target word can be calculated based on the five previous words of that target word.

The neural network 200 according to the first embodiment includes an input layer 10, intermediate layers 20a to 20c, an intermediate layer 30, and an output layer 40. In the following explanation, when the intermediate layers 20a to 20c need not be distinguished from each other, they are simply referred to as intermediate layers 20. In the example illustrated in FIG. 3, the neural network 200 has a two-layered configuration including the intermediate layers 20 and the intermediate layer 30. However, there can be any arbitrary number of intermediate layers.

The input layer 10 includes known-word unit groups 11a to 11c and part-of-speech unit groups 12a to 12c. In the following explanation, when the known-word unit groups 11a to 11c need not be distinguished from each other, they are simply referred to as known-word unit groups 11. In an identical manner, when the part-of-speech unit groups 12a to 12c need not be distinguished from each other, they are simply referred to as part-of-speech unit groups 12. Each known-word unit group 11 includes one or more known-word units. In an identical manner, each part-of-speech unit group 12 includes one or more part-of-speech units.

Firstly, the calculating unit 4 inputs information in the input layer 10 based on the three previous words of the target word.

More particularly, when the word one word before the target word is a known word, the calculating unit 4 inputs that known word in the known-word unit group 11a. On the other hand, when the word one word, before the target word is a new word, the calculating unit 4 inputs the part of speech of that new word in the part-of-speech unit group 12a.

Similarly, when the word two words before the target word is a known word, the calculating unit 4 inputs that known word in the known-word unit group 11b. On the other hand, when the word two words before the target word is a new word, the calculating unit 4 inputs the part of speech of that new word in the part-of-speech unit group 12b.

Moreover, when the word three words before the target word is a known word, the calculating unit 4 inputs that known word, in the known-word, unit group 11c. On the other hand, when the word three words before the target word is a new word, the calculating unit 4 inputs the part of speech of that new word in the part-of-speech unit group 12c.

Herein, the method by which the calculating unit 4 inputs a known word in the known-word unit group 11 can be any arbitrary method. For example, with respect to each known word, the calculating unit 4 inputs a predetermined vector enabling identification of that known word in the known-word unit group 11. The vector enabling identification of a known word, corresponds to each known word registered in the known-word dictionary. Herein, the vector enabling identification of a known word can be decided in an arbitrary manner. For example, the vector enabling identification of a known word can be a vector $(0, 0, 0, \ldots, 0, 1, 0, \ldots, 0, 0, 0)$ in which the single concerned component is "1" and all other components are "0". In this case, each component of the vector corresponds to a unit included in the known-word unit group 11. The unit, in which "1" is input, is called an activated unit.

In an identical manner, the method by which the calculating unit 4 inputs the part of speech of a known word in the part-of-speech unit group 12 can be any arbitrary method. For example, with respect to each part of speech, the calculating unit 4 inputs a predetermined vector enabling identification of that part of speech in the part-of-speech unit group 12.

In the following explanation, a column vector that is formed by vertically concatenating the vectors input in the known-word unit groups 11 of the input layer 10 and the vectors input in the part-of-speech unit groups 12 of the input layer 10 is called a word vector $v^k$ (k=1, 2, 3).

Subsequently, in the intermediate layer 20, the calculating unit 4 inputs a vector $w^k$ (k=1, 2, 3) that is formed by performing linear operation according to Equation (4) given below with respect to the word vector $v^k$ (k=1, 2, 3) of the input layer 10.

$$w^k = W v^k \quad (4)$$

Herein, W represents a matrix expressing the parameters indicating the connection weight of the word vector $v^k$.

Subsequently, in the intermediate layer 30, the calculating unit 4 inputs a vector h that is formed by performing an operation according to Equation (5) given below with respect to the vector $w^k$ (k=1, 2, 3) of the intermediate layer 20.

$$h_i = \tan h[(Sw+u)_i] \quad (5)$$

Herein, i represents the i-th component of the vector h. Moreover, w represents a column vector that is formed by vertically concatenating the vectors $w^k$ (k=1, 2, 3) of the intermediate layer 20. Furthermore, S represents a matrix expressing the parameters indicating the connection weight of the word vector w. Moreover, u represents a threshold parameter of the intermediate layer 30. Furthermore, tan h represents a hyperbolic tangent function.

Thus, the vector h is obtained by performing linear operation with respect to the vector w and then applying the hyperbolic tangent function to the vector w.

Subsequently, with respect to a vector a that is formed by performing linear operation according to Equation (6) given below with respect to the vector h of the intermediate layer 30, the calculating unit 4 implements the softmax function according to Equation (7) given below. Then, the calculating unit 4 inputs a vector y to the output layer 40.

$$a = Th + r \quad (6)$$

$$y_i = \exp(a_i) / \Sigma_j \exp(a_j) \quad (7)$$

Herein, T represents a matrix expressing the parameters indicating the connection weight of the word vector h. Moreover, r represents a threshold parameter of the output layer 40. Furthermore, i represents the i-th component of the vectors y and a. Moreover, j represents the j-th component of the vector a. Furthermore, exp represents an exponent function.

The output layer 40 includes a known-word score unit group 41 and a part-of-speech score unit group 42. The known-word score unit group 41 includes one or more known-word score units. Each known-word score unit represents the score of a single known word. The part-of-speech score unit group 42 includes one or more part-of-speech score units. Each part-of-speech score unit represents the score of a single part of speech. Herein, examples of a part of speech include a verb, a noun, and an adjective.

As a result of using the neural network 200 that has the configured explained above, even in the case in which a string of words including known words and parts of speech is provided to the input layer 10, the calculating unit 4 can calculate the word score of the target word.

More particularly, regarding a target word $s_i$, a value $y_i$ in the output layer 40 corresponding to the target word $s_i$ represents the word score $P(s_i|v^1, v^2, v^3)$ of the target word $s_i$. Even if the target word $s_i$ is a new word, since the part-of-speech score unit group 42 is present in the output layer 40, the calculating unit 4 can calculate the word score of the new word using the scores of the parts of speech.

Meanwhile, although the neural network 200 illustrated in FIG. 3 is a feedforward neural network, it is also possible to use a neural network having a different configuration. For example, the neural network 200 cam be a recurrent neural network.

Word Score Calculation Method

Given below is the explanation of an exemplary word score calculation method according to the first embodiment.

FIG. 4 is a flowchart for explaining an exemplary word score calculation method according to the first embodiment. Firstly, the input unit 2 receives input of a string of words in which known words and new words are included as the words (Step S1). Then, the identifying unit 3 identifies the parts of speech of the new words included in the string of words (Step S2).

Subsequently, the calculating unit 4 inputs the known words in the known-word unit groups 11 of the input layer 10 (Step S3). More particularly, when the word one word before the target word is a known word, the calculating unit 4 inputs that known word in the known-word unit group 11a. Similarly, when the word two words before the target word is a known word, the calculating unit 4 inputs that known word in the known-word unit group 11b. Moreover, when the word three words before the target word is a known word, the calculating unit 4 inputs that known word in the known-word unit group 11c.

Then, the calculating unit 4 inputs the parts of speech of the new words in the part-of-speech unit groups 12 of the input layer 10 (Step S4). More particularly, when the word one word before the target word is a new word, the calculating unit 4 inputs the part of speech of that new word in the part-of-speech unit group 12a. Similarly, when the word two words before the target word is a new word, the calculating unit 4 inputs the part of speech of chat new word in the part-of-speech unit group 12b, Moreover, when the word three words before the target word is a new word, the calculating unit 4 inputs the part of speech of that new word in the part-of-speech unit group 12c.

Subsequently, the calculating unit 4 determines whether or not the target word is a new word (Step S5). If the target word is a new word (Yes at Step S5), then the calculating unit 4 calculates the part-of-speech score of the part-of-speech score unit group 42 of the output layer 40 as the word score of the target word (Step S6).

On the other hand, if the target word is not a new word (No at Step S5), then the calculating unit calculates the known-word score of the known-word score unit group 41 of the output layer 40 as the word score of the target word (Step S7).

As described above, in the word score calculation device 100 according to the first embodiment, the input unit 2 receives input of a string of words including known words, which are known already, and new words, which are not yet known. Then, the calculating unit 4 uses the neural network 200 (see FIG. 3) and calculates the word score of the target, word, which represents the target word for calculation included in the string of words.

More particularly, when a word included in the string of words is a new word, the calculating unit 4 inputs the part of speech of that new word in the part-of-speech unit group 12. When a word included in the string of words is a known word, the calculating unit 4 inputs the known, word in the known-word unit group 11. Then, if the target word is a known word, the calculating unit 4 calculates the score of the known-word score unit group 41 as the word score. If the target word is a new word, the calculating unit 4 calculates the score of the part-of-speech score unit group 42 as the word score.

Thus, even in the case in which a string of words, which includes new words not included in the lexicon of the word score calculation device 100 according to the first embodiment, is provided to the word score calculation device 100; it becomes possible to calculate the word score of the string of words.

Meanwhile, the identifying unit 3 can identify the part of speech of a new word according to some other method other than using the new-word dictionary described earlier. For example, the identifying unit 3 can use a part-of-speech class estimation example dictionary (see Patent Literature 1), More particularly, the identifying unit 3 can collate the examples given in the part-of-speech class estimation example dictionary with the new word, and identify the part of speech of the new word.

Still alternatively, for example, the identifying unit 3 can identify the part of speech based on the rhyme of the end of the word.

Modification Example of First Embodiment

Given below is the explanation of a modification example of the first embodiment. In the explanation of the modification example of the first embodiment, the same explanation as given in the first embodiment is not repeated, and only the differences with the first embodiment are explained.

In the modification example according to the first embodiment, the memory unit 1 is used to further store new-word appearance scores, and the calculating unit 4 calculates the word scores by further using the new-word appearance scores. In the modification example of the first embodiment, the explanation is given for an example in which the part of speech represents the lexicon feature.

FIG. 5 is a diagram illustrating an example of new-word appearance scores according to the modification example of the first embodiment. The new-word appearance score is defined for each combination of a new word and a part of speech. Moreover, a new-word, appearance score represents the ease of appearance of a new word. When a new word 111 appears as a verb, the new-word appearance score is equal to 0.05. When a new word 112 appears as a verb, the new-word appearance score is equal to 0.01.

In the explanation of the first embodiment, the calculating unit 4 calculates the word score of a new word using the score of the part-of-speech score unit group 42. However, in the word score calculation device 100 according to the first embodiment, for example, both the new words 111 and 112 happen to have the same word score because both, of them are verbs. In the modification example of the first embodiment, regarding new words of the same part of speech, the calculating unit 4 further uses the new-word appearance scores so as to have differences among the word scores.

In the example illustrated, in FIG. 5, the new word 111 has a higher new-word, appearance score than the new-word appearance score of the new word 112. When the target word is a new word, the calculating unit 4 calculates the word score based oil the new-word appearance score and the score of the part-of-speech score unit group 42. For example, the calculating unit 4 calculates the word score as the product of the new-word appearance score and the score of the part-of-speech score unit group 42.

Word Score Calculation Method

Given below is the explanation of a word score calculation method according to the modification example of the first embodiment.

Figure 6:
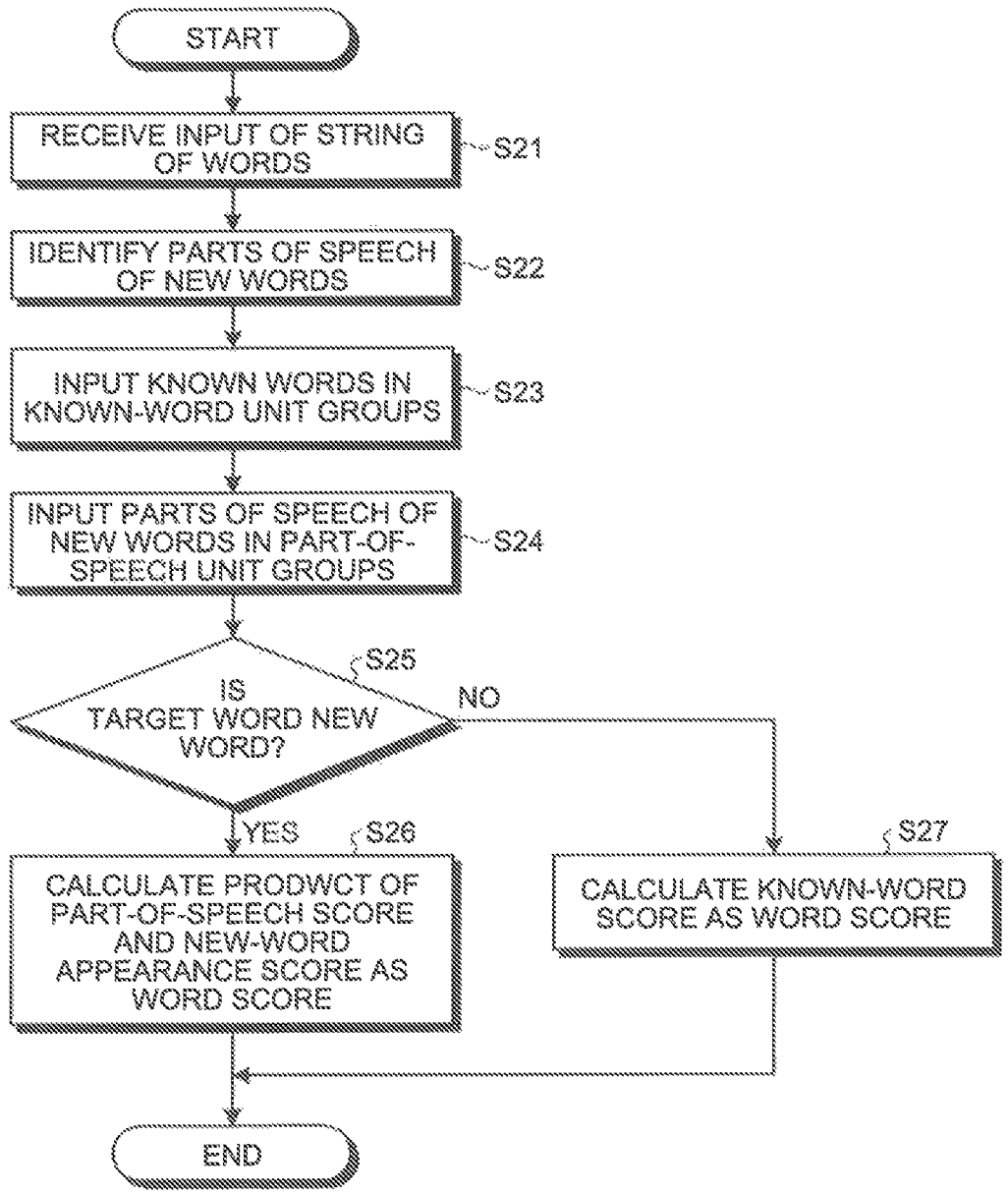
FIG. 6 is a flowchart for explaining an exemplary word score calculation method according to the modification example of the first embodiment.

FIG. 6 is a flowchart for explaining an exemplary word score calculation method according to the modification example of the first embodiment. The explanation of Steps S21 to S25 and Step S27 is identical to the explanation of Steps S1 to S5 and Step S7 (see FIG. 4) according to the first embodiment. Hence, that explanation is not repeated.

When the target word is a new word (Yes at Step S25), the calculating unit 4 calculates the word score of the target word as the product of the score of the part-of-speech score unit group 42 of the output layer 40 and the new-word appearance score of the new word (Step S26).

As described above, in the word score calculation device 100 according to the modification example of the first embodiment, since the difference in the ease of appearance of new words is further taken into account, it becomes possible to calculate highly accurate word scores.

Second Embodiment

Given below is the explanation of a second embodiment. In the second embodiment, the same explanation as given in the first embodiment is not repeated, and only the differences with the first embodiment are explained.

Regarding a functional configuration of the word score calculation device 100 according to the second embodiment, the explanation is identical to the explanation of the exemplary functional configuration of the word score calculation device 100 according to the first embodiment (see FIG. 1). Hence, that explanation is not repeated. In the second embodiment, the explanation is given about a case in which the part of speech represents the lexicon feature.

As compared to the first embodiment, the second embodiment differs in the way that the output layer 40 of the neural network 200 does not include the part-of-speech score unit group 42.

Figure 7:
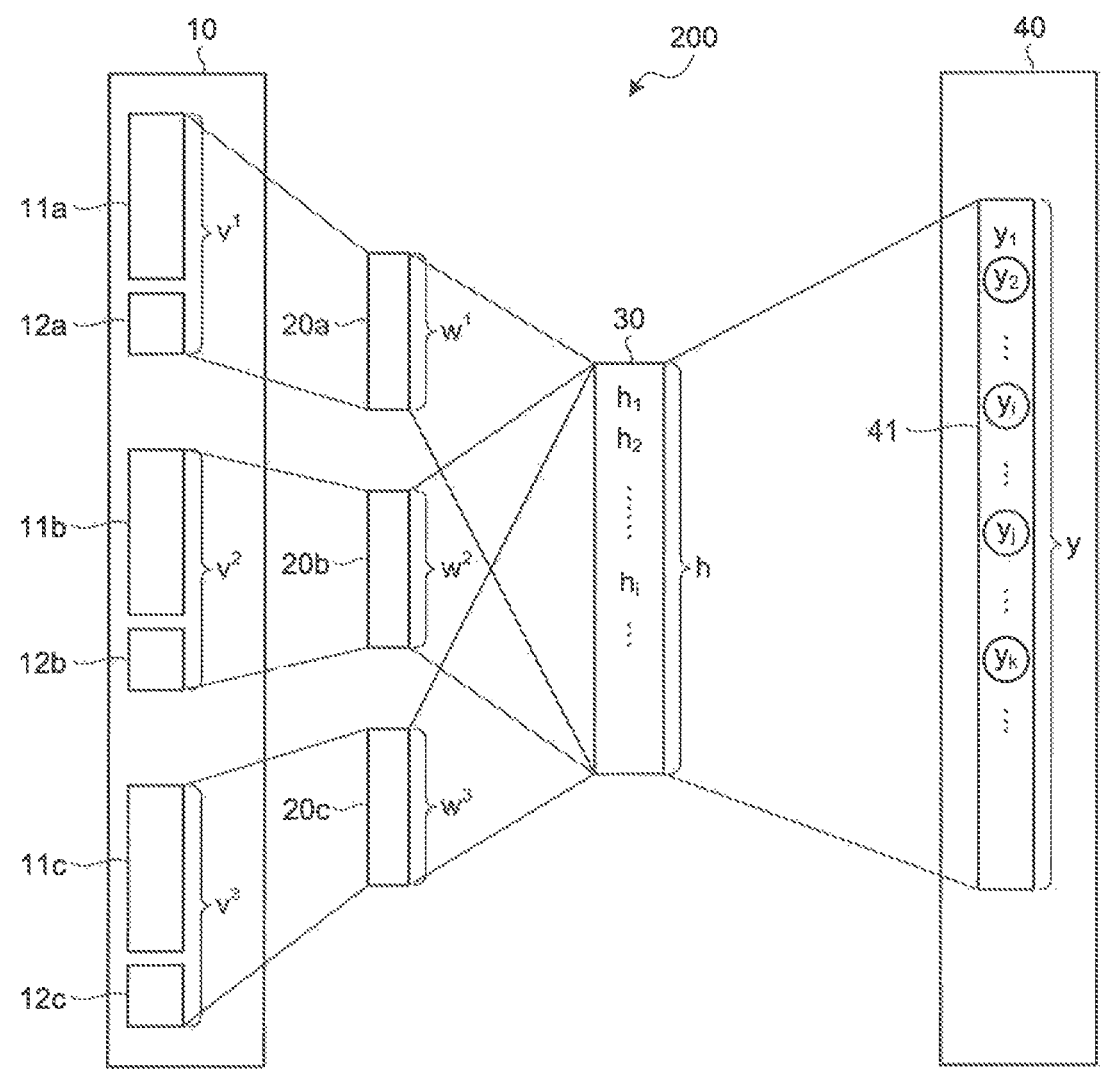
FIG. 7 is a diagram illustrating an example of the neural network according to a second embodiment.

FIG. 7 is a diagram illustrating an example of the neural network 200 according to the second embodiment. The neural network 200 according to the second embodiment includes the input layer 10, the intermediate layers 20a to 20c, the intermediate layer 30, and the output layer 40. The explanation of the input layer 10, the intermediate layers 20a to 20c, and the intermediate layer 30 is identical to the explanation given in the first embodiment. Hence, that explanation is not repeated.

The output layer 40 includes the known-word score unit group 41, which represents the scores of known words. The known-word score unit group 41 includes one or more known-word score units. Each known-word score unit represents the score of a single known word.

When the target word is a new word, the calculating unit 4 calculates the word score of the new word based on the scores of such known words, from among some or all scores of known, words included in the known-word score unit group 41, that have the identical part of speech to the part of speech of the target new word. For example, when the target word is a new word, the calculating unit 4 calculates, as the word score of the new word, the sum of scores of such known words, from among some or all scores of known words included in the known-word score unit group 41, that have the identical part of speech to the part of speech of the target new word.

In FIG. 7 is illustrated a case in which the part of speech of the known words corresponding to the known-word scores indicated by the components $y_2$, $y_i$, $y_j$, and $y_k$ of the vector y is identical to the part of speech, of the target word that is a new word. In this case, if the target word is a new word, the calculating unit 4 calculates the sum of scores of the known words indicated by the components $y_2$, $y_i$, $y_j$, and $y_k$ as the word score of the new word.

Word Score Calculation Method

Given below is the explanation of a word score calculation method according to the second embodiment.

Figure 8:
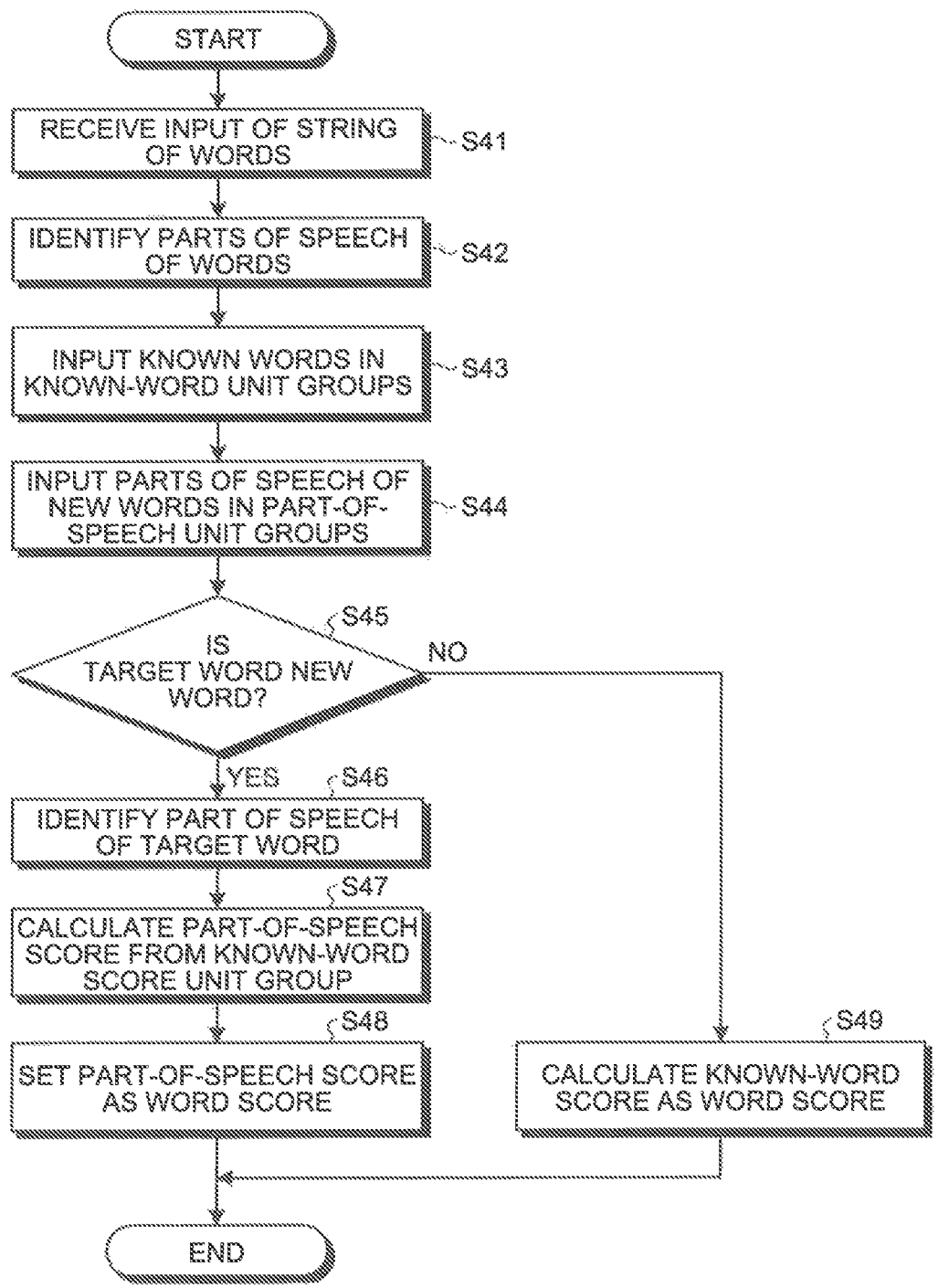
FIG. 8 is a flowchart for explaining an exemplary word score calculation method according to the second embodiment.

FIG. 8 is a flowchart for explaining an exemplary word score calculation method according to the second embodiment. Firstly, the input unit 2 receives input of a string of words in which known words and new words are included as the words (Step S41). Then, the identifying unit 3 identifies the parts of speech of the words included in the string of words (Step S42).

The explanation of Steps S43 and S44 is identical to the explanation of Steps S3 and S4 (see FIG. 4) according to the first embodiment. Hence, that explanation is not repeated.

Subsequently, the calculating unit 4 determines whether or not the target word is a new word (Step S45). If the target word is a new word (Yes at Step S45), the identifying unit 3 identifies the part of speech of the target word (Step S46). Then, the calculating unit 4 calculates, as the part-of-speech score of the new word, the sum of scores of such known words, from among some or all scores of known words included in the known-word score unit group 41, that have the identical part of speech to the part of speech identified at Step S46 (Step S47). Subsequently, the calculating unit 4 sets the part-of-speech score, which is calculated at Step S47, as the word score of the target word (Step S48).

Meanwhile, if the target word is not a new word (No at Step S45), then the calculating unit 4 calculates, as the word score of the target word, the known-word score of the known-word score unit group 41 of the output layer 40 (Step S49).

As described above, in the word score calculation device 100 according to the second embodiment, the part-of-speech score unit group 42 of the output layer 40 is not present. Hence, as compared to the first embodiment, it becomes possible to reduce the parameters of the neural network 200. Thus, in the word score calculation device 100 according to the second embodiment, it becomes possible to reduce the memory size of the neural network 200 that is stored in the memory unit 1.

Third Embodiment

Given below is the explanation of a third embodiment. In the third embodiment, the same explanation as given in the first embodiment is not repeated, and only the differences with the first embodiment are explained.

As compared to the first embodiment, the word score calculation device 100 according to the third embodiment differs in the way that the calculating unit 4 uses the neural network 200 that includes a first neural network and a second neural network which are structurally decoupled. In the third embodiment, the explanation is given about a case in which the part of speech represents the lexicon feature.

Figure 9:
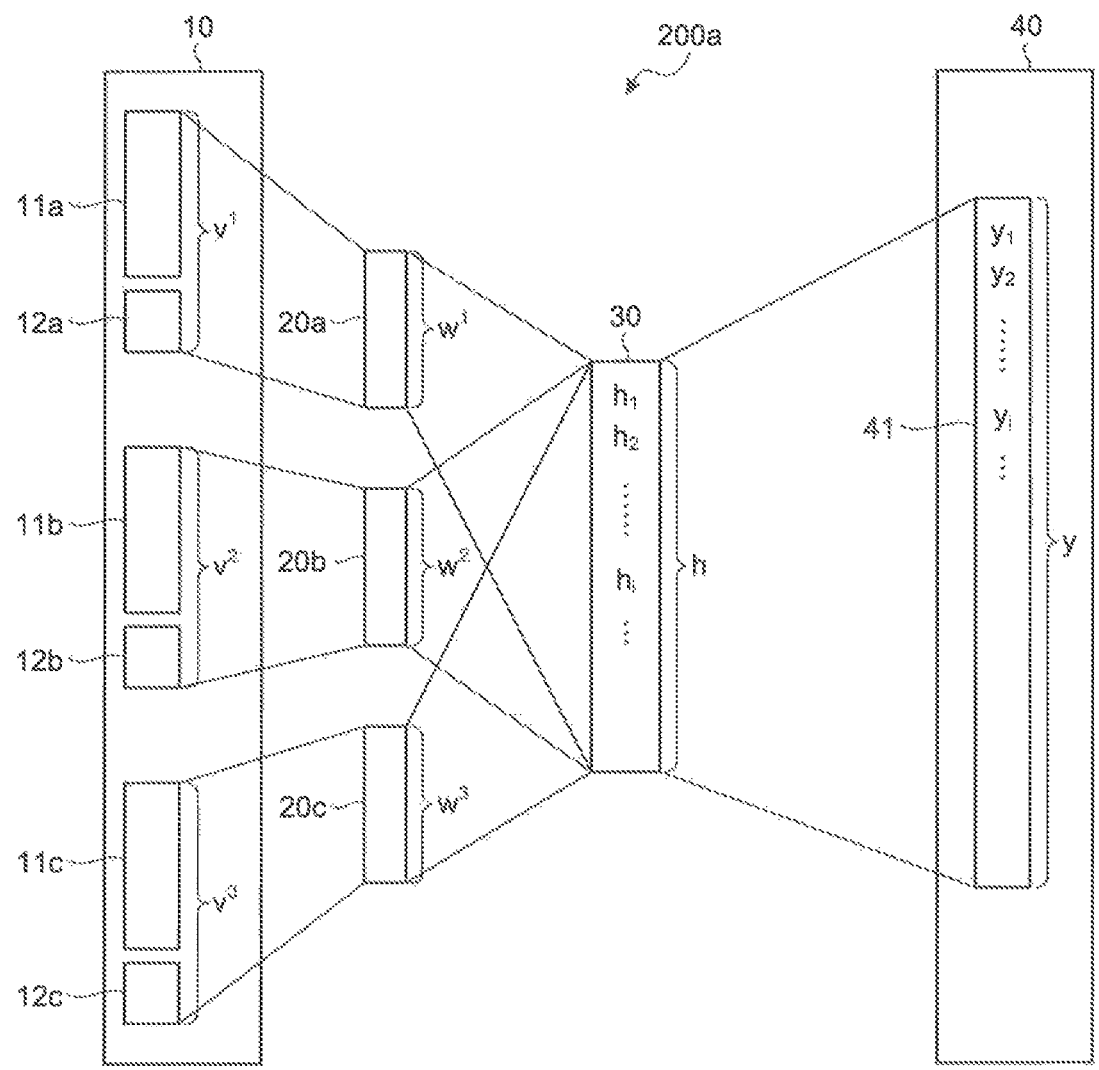
FIG. 9 is a diagram illustrating an example of a first neural network according to a third embodiment.

FIG. 9 is a diagram illustrating an example of a first neural network 200a according to the third embodiment. The first neural network 200a according to the third embodiment includes the input layer 10, the intermediate layers 20a to 20c, the intermediate layer 30, and the output layer 40. The explanation of the input layer 10, the intermediate layers 20a to 20c, and the intermediate layer 30 in the first neural network 200a according to the third embodiment is identical to the explanation of the neural network 200 according to the first embodiment. Hence, that explanation is not repeated.

The output layer 40 includes the known-word score unit group 41, which includes one or more known-word score units. Each known-word score unit represents the score of a single known word.

Figure 10:
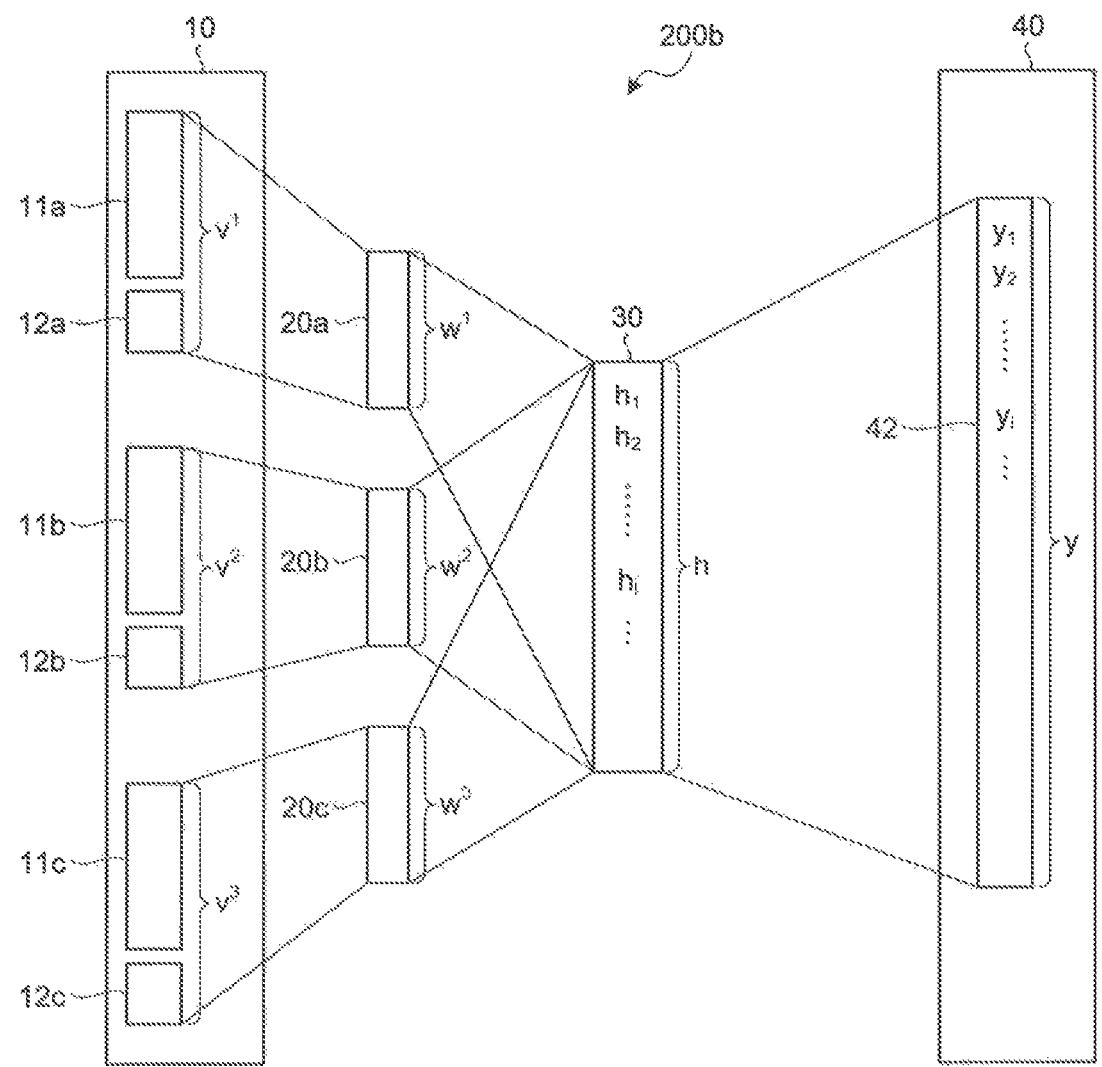
FIG. 10 is a diagram illustrating an example of a second neural network according to the third, embodiment.

FIG. 10 is a diagram illustrating n example of a second neural network 200b according to the third embodiment. The second neural network 200b according to the third embodiment includes the input layer 10, the intermediate layers 20a to 20c, the intermediate layer 30, and the output layer 40. The explanation of the input layer 10, the intermediate layers 20a to 20c, and the intermediate layer 30 in the second neural network 200b according to the third embodiment is identical to the explanation of the neural network 200 according to the first embodiment. Hence, that explanation is not repeated.

The output layer 40 includes the part-of-speech score unit group 42, which includes one or sore part-of-speech score units. Each part-of-speech score unit represents the score of a single part of speech. Herein, examples of a part of speech include a verb, a noun, and an adjective.

Word Score Calculation Method

Given below is the explanation of an exemplary word score calculation method according to the third embodiment.

Figure 11:
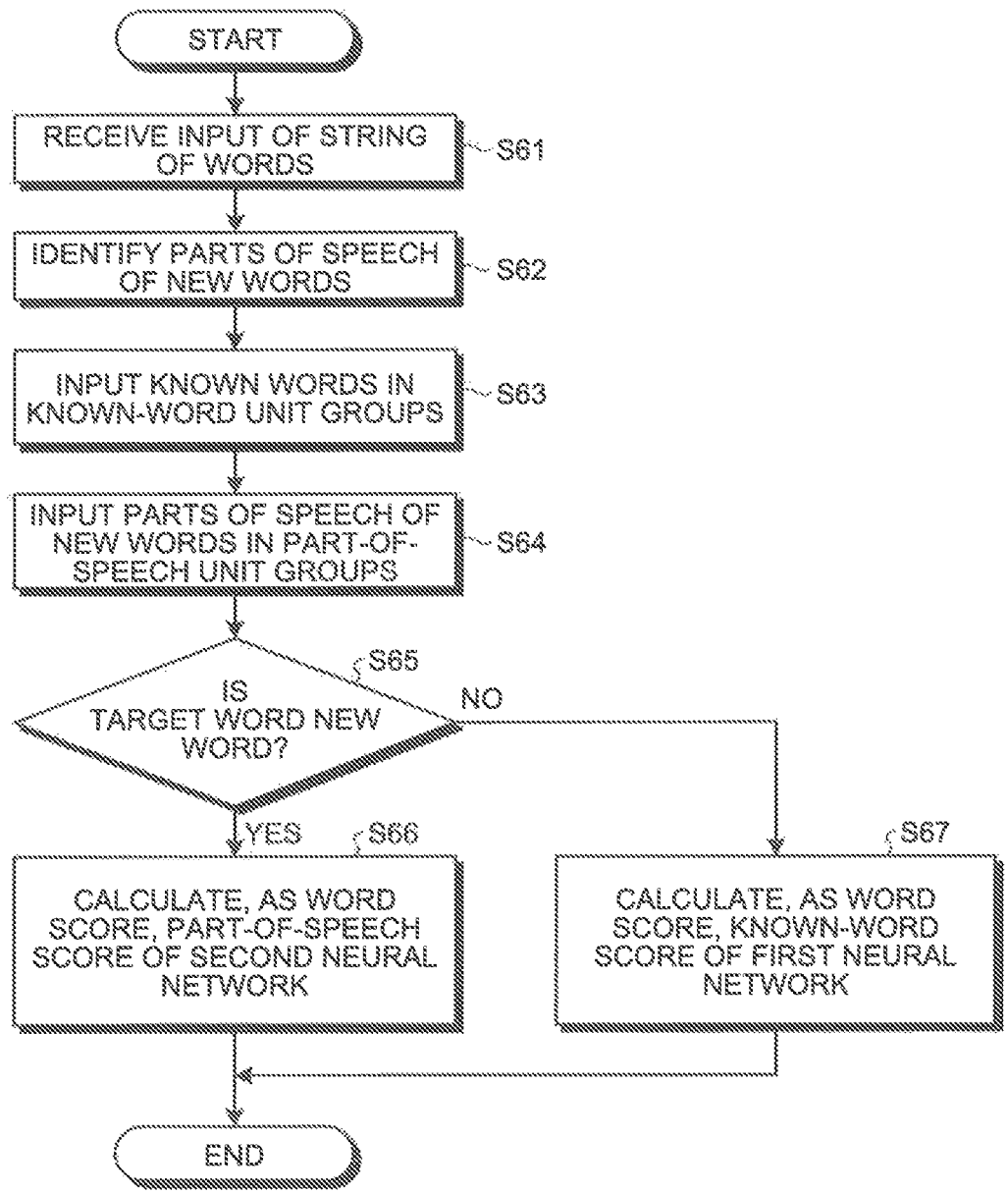
FIG. 11 is a flowchart for explaining an exemplary word score calculation method according to the third embodiment.

FIG. 11 is a flowchart for explaining an exemplary word score calculation method according to the third embodiment. The explanation of Steps S61 to S64 is identical to the explanation of Steps S1 to S4 (see FIG. 4) according to the first embodiment. Pence, that, explanation is not repeated.

Subsequently, the calculating unit 4 determines whether or not the target word is a new word (Step S55). If the target word is a new word (Yes at Step S65), then the calculating unit 4 calculates, as the word score of the target word, the part-of-speech score of the part-of-speech score unit group 42 of the second neural network 200b (Step S66).

If the target word is not a new word (No at Step S65), then the calculating unit 4 calculates, as the word score of the target word, the known-word score of the known-word score unit group 41 of the first neural network 200a (Step S67).

As described above, in the word score calculation device 100 according to the third embodiment, the first neural network 200a used in calculating the known-word scores and the second neural network 200b used in calculating the part-of-speech scores can have the structures suitable for respective score calculations.

Fourth Embodiment

Given below is the explanation of a fourth embodiment. In the fourth embodiment, the same explanation as given in the first embodiment is not repeated, and only the differences with the first embodiment are explained.

As compared to the first embodiment, the word score calculation device 100 according to the fourth embodiment differs in the way that the known-word unit group 11 is not present in the input layer 10 of the neural network 200, and that the known-word score unit group 41 is not present in the output layer 40 of the neural network 200. In the fourth embodiment, the explanation is given about a case in which the part of speech represents the lexicon feature.

Figure 12:
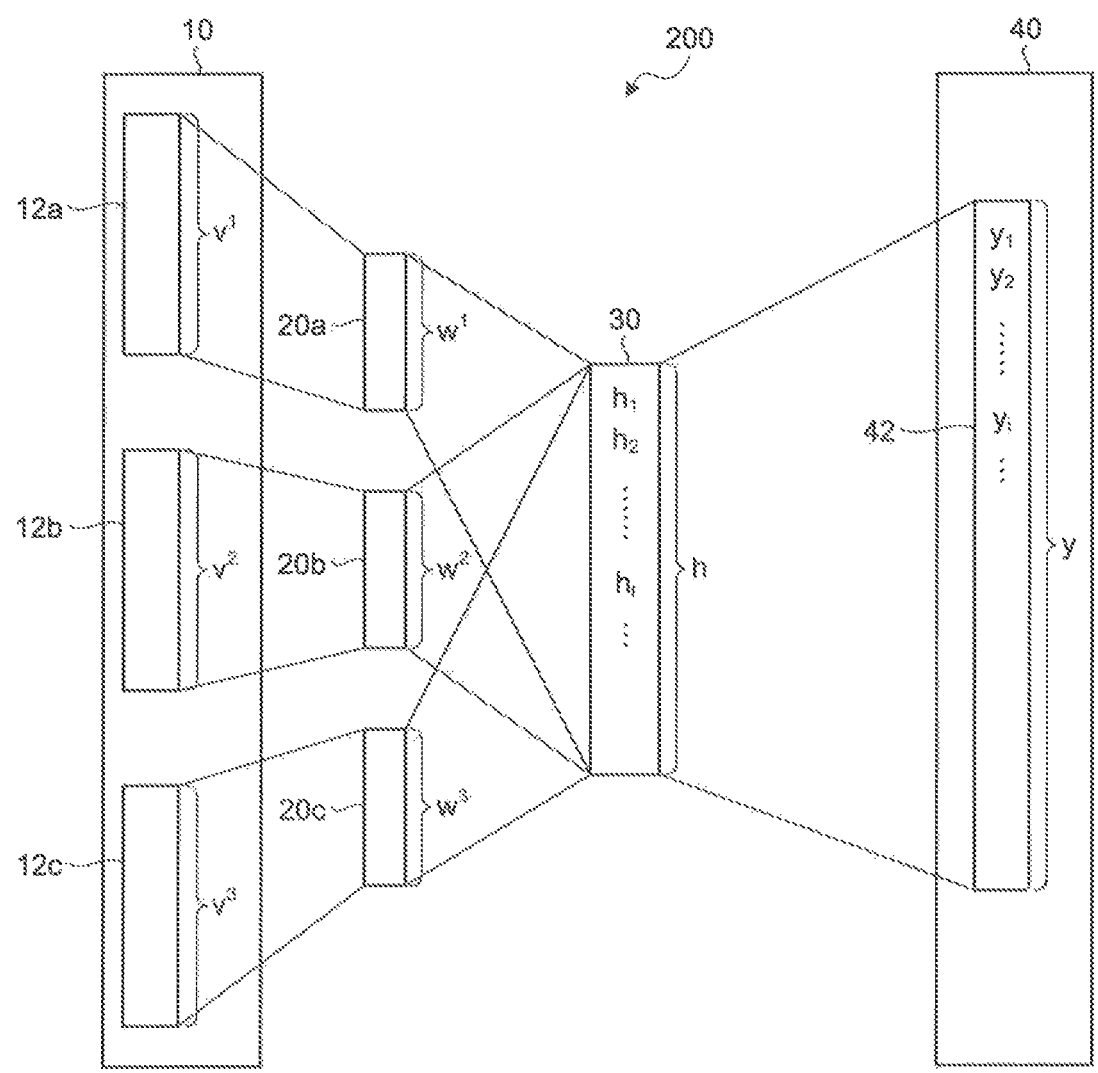
FIG. 12 is a diagram illustrating an example of the neural network according to a fourth embodiment.

FIG. 12 is a diagram illustrating an example of the neural network 200 according to the fourth embodiment. The neural network 200 according to the fourth embodiment includes the input layer 10, the intermediate layers 20a to 20c, the intermediate layer 30, and the output layer 40.

The input layer 10 includes the part-of-speech unit groups 12a to 12c. Each part-of-speech unit group 12 includes one or more part-of-speech units.

Firstly, the calculating unit 4 inputs information in the input layer 10 based on the three previous words of the target word. More particularly, the calculating unit 4 inputs, in the part-of-speech unit group 12a, the part of speech of the word one word before the target word. Moreover, the calculating unit 4 inputs, in the part-of-speech unit group 12b, the part of speech of the word two words before the target word. Furthermore, the calculating unit 4 inputs, in the part-of-speech unit group 12c, the part of speech of the word three words before the target word.

The explanation about the intermediate layers 20a to 20c and the intermediate layer 30 according to the fourth embodiment is identical to the explanation about the intermediate layers 20a to 20c and the intermediate layer 30 according to the first embodiment. Hence, that explanation is not repeated.

The output layer 40 includes the part-of-speech score unit group 42, which includes one or more part-of-speech score units. Each part-of-speech score unit represents the score of a single part of speech. Herein, examples of a part of speech include a verb, a noun, and an adjective.

Word Score Calculation Method

Given below is the explanation of an exemplary word score calculation method according to the fourth embodiment.

Figure 13:
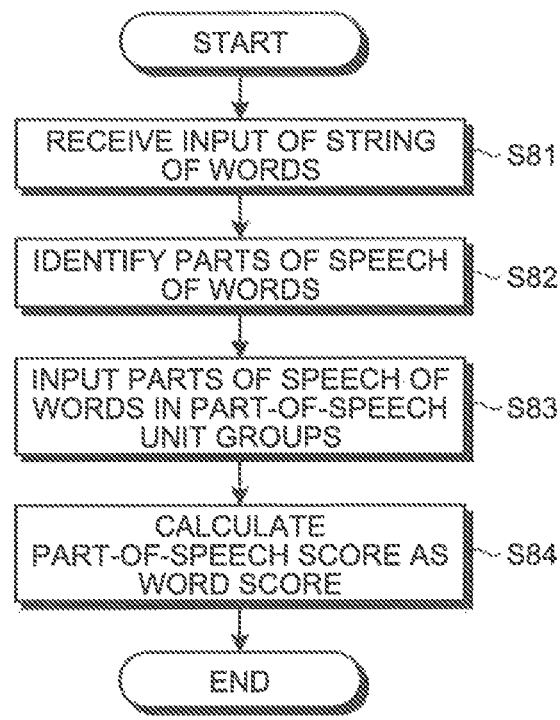
FIG. 13 is a flowchart for explaining an exemplary word score calculation method according to the fourth embodiment.

FIG. 13 is a flowchart for explaining an exemplary word score calculation method according to the fourth embodiment. Firstly, the input unit 2 receives input of a string of words in which known words and new words are included as the words (Step S81). Then, the identifying unit 3 identifies the parts of speech of the words included in the string of words (Step S82).

Subsequently, the calculating unit 4 inputs the parts of speech of the words in the part-of-speech unit groups 12 of the input layer 10 (Step S83). More particularly, the calculating unit 4 inputs, in the part-of-speech unit group 12a, the part of speech of the word one word before the target word. Moreover, the calculating unit 4 inputs, in the part-of-speech unit group 12b, the part of speech of the word two words before the target word. Furthermore, the calculating unit 4 inputs, in the part-of-speech unit group 12c, the part of speech of the word three words before the target word.

Then, the calculating unit 4 calculates, as the word score of the target word, the part-of-speech score of the part-of-speech score unit group 42 of the output layer 40 (Step S84).

As described above, in the word score calculation device 100 according to the fourth embodiment, the known-word unit group 11 is not present in the input layer 10 of the neural network 200, and the known-word score unit group 41 is not present in the output layer 40 of the neural network 200. Hence, in the word score calculation device 100 according to the fourth embodiment, it becomes possible to reduce the parameters of the neural network 200 as compared to the first embodiment. Thus, in the word score calculation device 100 according to the fourth embodiment, it becomes possible to reduce the memory size of the neural network 200 that is stored in the memory unit 1.

Meanwhile, in the word score calculation device 100 according to the fourth embodiment, the parts of speech represent the information input in the input layer 10, and the part-of-speech scores represent the information output from the output layer 40. Hence, the information handled in the neural network 200 can be dedicated to the parts of speech. For that reason, in the word score calculation device 100 according to the fourth embodiment, the statistical learning of the neural network 200 can be performed advantageously.

Hardware Configuration of Word Score Calculation Device

Lastly, the explanation is given for an exemplary hardware configuration of the word score calculation device 100 according to the first to fourth embodiments.

Figure 14:
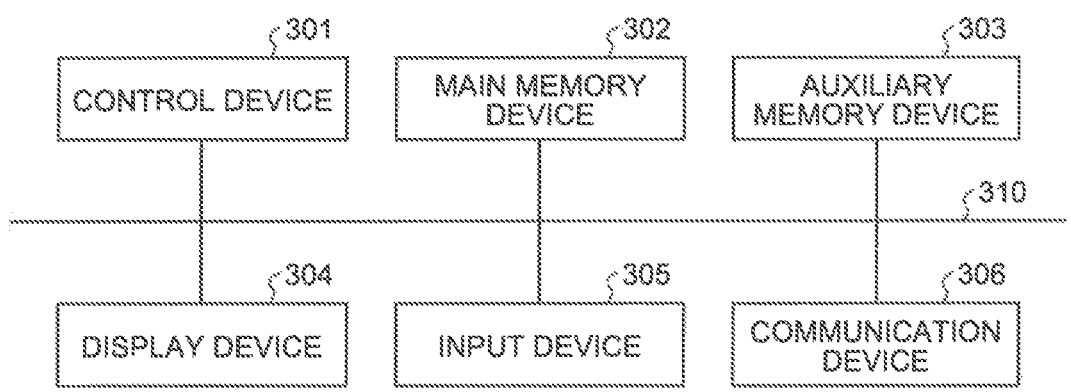
FIG. 14 is a diagram illustrating an exemplary hardware configuration of the word score calculation device according to the first to fourth embodiments.

FIG. 14 is a diagram illustrating an exemplary hardware configuration of the word score calculation device 100 according to the first to fourth embodiments. The word score calculation device 100 according to the first to fourth embodiments includes a control device 301, a main memory device 302, an auxiliary memory device 303, a display device 304, an input device 305, and a communication device 306. The control device 301, the main memory device 302, the auxiliary memory device 303, the display device 304, the input device 305, and the communication device 306 are connected to one another via a bus 310.

The control device 301 executes computer programs that are read from the auxiliary memory device 303 into the main memory device 302. The main memory device 302 is a memory such as a read only memory (ROM) or a random access memory (RAM). The auxiliary memory device 303 is a memory card or a solid state drive (SSD).

The display device 304 is used to display information. Examples of the display device 304 include a liquid crystal display. The input device 305 receives input of information. Examples of the input device 305 include a keyboard and a mouse. Meanwhile, the display device 304 and the input device 305 can be configured as a liquid crystal touch-sensitive panel having the display function as well as the input function. The communication device 306 performs communication with other devices.

The computer programs executed in the word score calculation device 100 according to the first to fourth embodiments are stored as installable or executable files in a computer-readable memory medium such as a compact disk read only memory (CD-ROM), a memory card, a compact disk recordable (CD-R), or a digital versatile disk (DVD); and are provided as a computer program product.

Alternatively, the computer programs executed in the word score calculation device 100 according to the first to fourth embodiments can be stored in a downloadable manner in a computer connected to a network such as the Internet. Still alternatively, the computer programs executed in the word score calculation device 100 according to the first to fourth embodiments can be non-downloadably distributed over a network such as the Internet.

Still alternatively, the computer programs executed in the word score calculation device 100 according to the first to fourth embodiments can be stored in advance in a ROM.

The computer programs executed in the word score calculation device 100 according to the first to fourth embodiments contain modules of such functions, from among the functional configuration of the word score calculation device 100 according to the first to fourth embodiments, which can be implemented using computer programs.

Regarding a function to be implemented using a computer program, the control device 301 reads a computer program from a memory medium such as the auxiliary memory device 303 and executes the computer program so that the function to be implemented using that computer program is loaded in the main memory device 302. That is, the function to be implemented using that computer program is generated in the main memory device 302.

Meanwhile, some or all of the functions of the word score calculation device 100 according to the first to fourth embodiments can alternatively be implemented using hardware such as an integrated circuit (IC).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fail within the scope and spirit of the inventions.

What is claimed is:

1. A word score calculation device of a voice recognition system, comprising:
    one or more memory devices storing instructions and a lexicon;
    a neural network comprising:
        an input layer including:
            one or more first unit groups for inputting a lexicon feature of a word; and
            one or more second unit groups for inputting a known word; and
    one or more hardware processors electrically coupled to the memory and configured to execute the instructions to perform a method comprising:
        receiving an electronic input of a string of words including a known word, which is included in the lexicon, and a new word, which is not included in the lexicon;
        when a word included in the string of words is the new word, inputting a lexicon feature of the new word in a first unit group of the neural network, the lexicon feature of the new word including at least a part-of-speech of the new word;
        when the word included in the string of words is the known word, inputting the known word in a second unit group of the neural network;
        calculating a word score of a target word included in the string of words, wherein:
            an output layer of the neural network includes one or more third unit groups for indicating a score of the known word and includes one or more fourth unit groups for indicating a score of lexicon feature of the new word,
            when the target word is the known word, a score of a third unit group is calculated as the word score, and
            when the target word is the new word, a score of a fourth unit group is calculated as the word score.

2. The word score calculation device according to claim 1, wherein:
    the memory is used to store a known-word dictionary, in which the known word and lexicon feature of the known word are stored in a corresponding manner, and a new-word dictionary, in which the new word and lexicon feature of the new word are stored in a corresponding manner; and
    the one or more hardware processors are further configured to function as an identifying unit that
        when the word is a known word, identifies the lexicon feature by referring to the known-word dictionary, and that
        when the word is a new word, identifies the lexicon feature by referring to the new-word dictionary.

3. The word score calculation device according to claim 2, wherein:
    the memory is used to store a plurality of words as the lexicon.

4. The word score calculation device according to claim 1, wherein, when the target word is the new word, the calculating the word score includes calculating the word score based on a new-word appearance score, which is defined for each combination of the new word and the lexicon feature, and the score of the fourth unit group.

5. The word score calculation device according to claim 4, wherein, when the target word is the new word, the calculating the word score includes calculating the word score as a product of the new-word appearance score, which is defined for each combination of the new word and the lexicon feature, and the score of the fourth unit group.

6. The word score calculation device according to claim 1, wherein:
    an output layer of the neural network includes one or more third unit groups for indicating a score of the known word,
    when the target word is the known word, the calculating the word score includes calculating a score of a third unit group as the word score, and
    when the target word is the new word, the calculating the word score includes calculating the word score of the new word based on scores of the known words, from among some or all scores of known words included in the third unit groups, that have identical lexicon feature to lexicon feature of the target word.

7. The word score calculation device according to claim 6, wherein, when the target word is the new word, the calculating the word score includes calculating the word score of the new word as sum of scores of the known words, from among some or all scores of the known words included in the third unit groups, that have identical lexicon feature to lexicon feature of the target word.

8. A word score calculation device of a voice recognition system, comprising:
    one or more memory devices storing instructions and a lexicon;
    a neural network comprising:
        a first neural network and a second neural network,
        the first neural network comprising:
            an input layer including:
                one or more first unit groups for inputting a lexicon feature of a word; and
                one or more second unit groups for inputting a known word; and
            an output layer including:
                one or more third unit groups for indicating a score of the known word; and
        the second neural network comprising:
            an input layer including:
                the one or more first unit groups; and
                the one or more second unit groups; and
            an output layer including:
                one or more fourth unit groups for indicating a score of the lexicon feature of the new word; and
    one or more hardware processors electrically coupled to the memory and configured to execute the instructions to perform a method comprising:
        receiving an electronic input of a string of words including a known word, which is included in the lexicon, and a new word, which is not included in the lexicon;
        inputting the lexicon feature of the word in the neural network, the word being included in the string of words, and the lexicon feature of the word including at least a part-of-speech of the word; and calculating a word score of a target word included in the string of words, wherein:

when the word included in the string of words is the new word, inputting the lexicon feature of the new word in the first unit group of the first neural network and in the first unit group of the second neural network, when the word included in the string of words is the known word, inputting the known word in the second unit group of the first neural network and in the second unit group of the second neural network, when the target word is the known word, the calculating the word score includes calculating a score of a third unit group as the word score, and when the target word is the new word, the calculating the word score includes calculating a score of a fourth unit group as the word score.

9. A word score calculation method of a voice recognition system, comprising:

receiving input of a string of words including a known word, which is included in a lexicon, and a new word, which is not included in the lexicon; and inputting, when a word included in the string of words is the new word, a lexicon feature of the new word in a first unit group of a neural network, the lexicon feature of the new word including at least a part-of-speech of the new word;

inputting, when the word included in the string of words is the known word, the known word in a second unit group of the neural network;

calculating, utilizing the neural network, a word score of a target word included in the string of words;

wherein:

an output layer of the neural network includes one or more third unit groups for indicating a score of the known word and includes one or more fourth unit groups for indicating a score of the lexicon feature of the new word, when the target word is the known word, a score of a third unit group is calculated as the word score, and when the target word is the new word, a score of a fourth unit group is calculated as the word score.

10. A word score calculation device of a voice recognition system, comprising:

one or more memory devices storing instructions and a lexicon;

a neural network comprising:

an input layer including:

one or more first unit groups for inputting a lexicon feature of a word; and one or more second unit groups for inputting a known word; and one or more hardware processors electrically coupled to the memory and configured to execute the instructions to perform a method comprising:

receiving an electronic input of a string of words including a known word, which is included in the lexicon, and a new word, which is not included in the lexicon;

when a word included in the string of words is the new word, inputting a lexicon feature of the new word in a first unit group of the neural network, the lexicon feature of the new word including at least a part-of-speech of the new word;

when the word included in the string of words is the known word, inputting the known word in a second unit group of the neural network;

calculating a word score of a target word included in the string of words, wherein:

an output layer of the neural network includes one or more third unit groups for indicating a score of the known word, when the target word is the known word, the calculating the word score includes calculating a score of a third unit group as the word score, and when the target word is the new word, the calculating the word score includes calculating the word score of the new word based on scores of the known words, from among some or all scores of known words included in the third unit groups, that have identical lexicon feature to lexicon feature of the target word.

* * * * *